US009544220B2

United States Patent
Dasgupta et al.

(10) Patent No.: US 9,544,220 B2
(45) Date of Patent: Jan. 10, 2017

(54) BINARY SEARCH-BASED APPROACH IN ROUTING-METRIC AGNOSTIC TOPOLOGIES FOR NODE SELECTION TO ENABLE EFFECTIVE LEARNING MACHINE MECHANISMS

(71) Applicant: Cisco Technology, Inc., San Jose, CA (US)

(72) Inventors: Sukrit Dasgupta, Norwood, MA (US); Jean-Philippe Vasseur, Saint Martin d'Uriage (FR); Grégory Mermoud, Veyras (CH); Jonathan W. Hui, Belmont, CA (US)

(73) Assignee: Cisco Technology, Inc., San Jose, CA (US)

( * ) Notice: Subject to any disclaimer, the term of this patent is extended or adjusted under 35 U.S.C. 154(b) by 678 days.

(21) Appl. No.: 13/946,268

(22) Filed: Jul. 19, 2013

(65) Prior Publication Data

US 2014/0219078 A1   Aug. 7, 2014

Related U.S. Application Data

(60) Provisional application No. 61/761,123, filed on Feb. 5, 2013.

(51) Int. Cl.
*H04L 12/751* (2013.01)
*H04L 12/24* (2006.01)
(Continued)

(52) U.S. Cl.
CPC .......... *H04L 45/08* (2013.01); *H04L 41/0677* (2013.01); *H04L 41/5009* (2013.01); *H04L 43/106* (2013.01); *H04L 45/28* (2013.01)

(58) Field of Classification Search
None
See application file for complete search history.

(56) References Cited

U.S. PATENT DOCUMENTS 6,804,712 B1   10/2004   Kracht
6,931,441 B1   8/2005   Roden et al.
(Continued)

OTHER PUBLICATIONS

Dasgupta, et al., "Binary Search-Based Approach in Routing-Metric Agnostic Topologies for Node Selection to Enable Effective Learning Machine Mechanisms", U.S. Appl. No. 61/761,123, filed Feb. 5, 2013, 26 pages, U.S. Patent and Trademark Office.
(Continued)

*Primary Examiner* — Chirag Shah
*Assistant Examiner* — Srinivasa Reddivalam
(74) *Attorney, Agent, or Firm* — Parker Ibrahim & Berg LLC; James M. Behmke; Stephen D. LeBarron

(57) ABSTRACT

In one embodiment, nodes are polled in a network for Quality of Service (QoS) measurements, and a QoS anomaly that affects a plurality of potentially faulty nodes is detected based on the QoS measurements. A path, which traverses the plurality of potentially faulty nodes, is then computed from a first endpoint to a second endpoint. Also, a median node that is located at a point along the path between the first endpoint and the second endpoint is computed. Time-stamped packets are received from the median node, and the first endpoint and the second endpoint of the path are updated based on the received time-stamped packets, such that an amount of potentially faulty nodes is reduced. Then, the faulty node is identified from a reduced amount of potentially faulty nodes.

23 Claims, 6 Drawing Sheets

(51) Int. Cl.
 H04L 12/26 (2006.01)
 H04L 12/703 (2013.01)

(56) References Cited

U.S. PATENT DOCUMENTS

| | | | |
|---|---|---|---|
| 7,983,173 B2 | 7/2011 | Finn | |
| 7,983,174 B1 | 7/2011 | Monaghan et al. | |
| 2004/0199627 A1* | 10/2004 | Frietsch | H04L 69/40 709/224 |
| 2006/0126495 A1 | 6/2006 | Guichard et al. | |
| 2008/0049634 A1* | 2/2008 | Goyal | H04L 12/2697 370/252 |
| 2008/0089330 A1* | 4/2008 | Ballantyne | H04L 41/12 370/390 |
| 2011/0096675 A1* | 4/2011 | Li | H04L 43/10 370/252 |

OTHER PUBLICATIONS

Vasseur, et al., "Routing Metrics Used for Path Calculation in Low-Power and Lossy Networks", Request for Comments 6551, Mar. 2012, 30 pages, Internet Engineering Task Force Trust.
Winter, et al., "RPL: IPv6 Routing Protocol for Low-Power and Lossy Networks", Request for Comments 6550, Mar. 2012, 157 pages, Internet Engineering Task Force Trust.

\* cited by examiner

BINARY SEARCH-BASED APPROACH IN ROUTING-METRIC AGNOSTIC TOPOLOGIES FOR NODE SELECTION TO ENABLE EFFECTIVE LEARNING MACHINE MECHANISMS

RELATED APPLICATION

The present invention claims priority to U.S. Provisional Application Ser. No. 61/761,123, filed Feb. 5, 2013, entitled "BINARY SEARCH-BASED APPROACH IN ROUTING-METRIC AGNOSTIC TOPOLOGIES FOR NODE SELECTION TO ENABLE EFFECTIVE LEARNING MACHINE MECHANISMS", by Dasgupta, et al., the contents of which are incorporated herein by reference.

TECHNICAL FIELD

The present disclosure relates generally to computer networks, and, more particularly, to the use of learning machines within computer networks.

BACKGROUND

Low power and Lossy Networks (LLNs), e.g., Internet of Things (IoT) networks, have a myriad of applications, such as sensor networks, Smart Grids, and Smart Cities. Various challenges are presented with LLNs, such as lossy links, low bandwidth, low quality transceivers, battery operation, low memory and/or processing capability, etc. The challenging nature of these networks is exacerbated by the large number of nodes (an order of magnitude larger than a "classic" IP network), thus making the routing, Quality of Service (QoS), security, network management, and traffic engineering extremely challenging, to mention a few.

Machine learning (ML) is concerned with the design and the development of algorithms that take as input empirical data (such as network statistics and states, and performance indicators), recognize complex patterns in these data, and solve complex problems such as regression (which are usually extremely hard to solve mathematically) thanks to modeling. In general, these patterns and computation of models are then used to make decisions automatically (i.e., close-loop control) or to help make decisions. ML is a very broad discipline used to tackle very different problems (e.g., computer vision, robotics, data mining, search engines, etc.), but the most common tasks are the following: linear and non-linear regression, classification, clustering, dimensionality reduction, anomaly detection, optimization, association rule learning.

One very common pattern among ML algorithms is the use of an underlying model M, whose parameters are optimized for minimizing the cost function associated to M, given the input data. For instance, in the context of classification, the model M may be a straight line that separates the data into two classes such that M=a*x+b*y+c and the cost function would be the number of misclassified points. The ML algorithm then consists in adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data. Note that the example above is an over-simplification of more complicated regression problems that are usually highly multi-dimensional.

Learning Machines (LMs) are computational entities that rely on one or more ML algorithm for performing a task for which they haven't been explicitly programmed to perform. In particular, LMs are capable of adjusting their behavior to their environment (that is, "auto-adapting" without requiring a priori configuring static rules). In the context of LLNs, and more generally in the context of the IoT (or Internet of Everything, IoE), this ability will be very important, as the network will face changing conditions and requirements, and the network will become too large for efficiently management by a network operator. In addition, LLNs in general may significantly differ according to their intended use and deployed environment.

Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
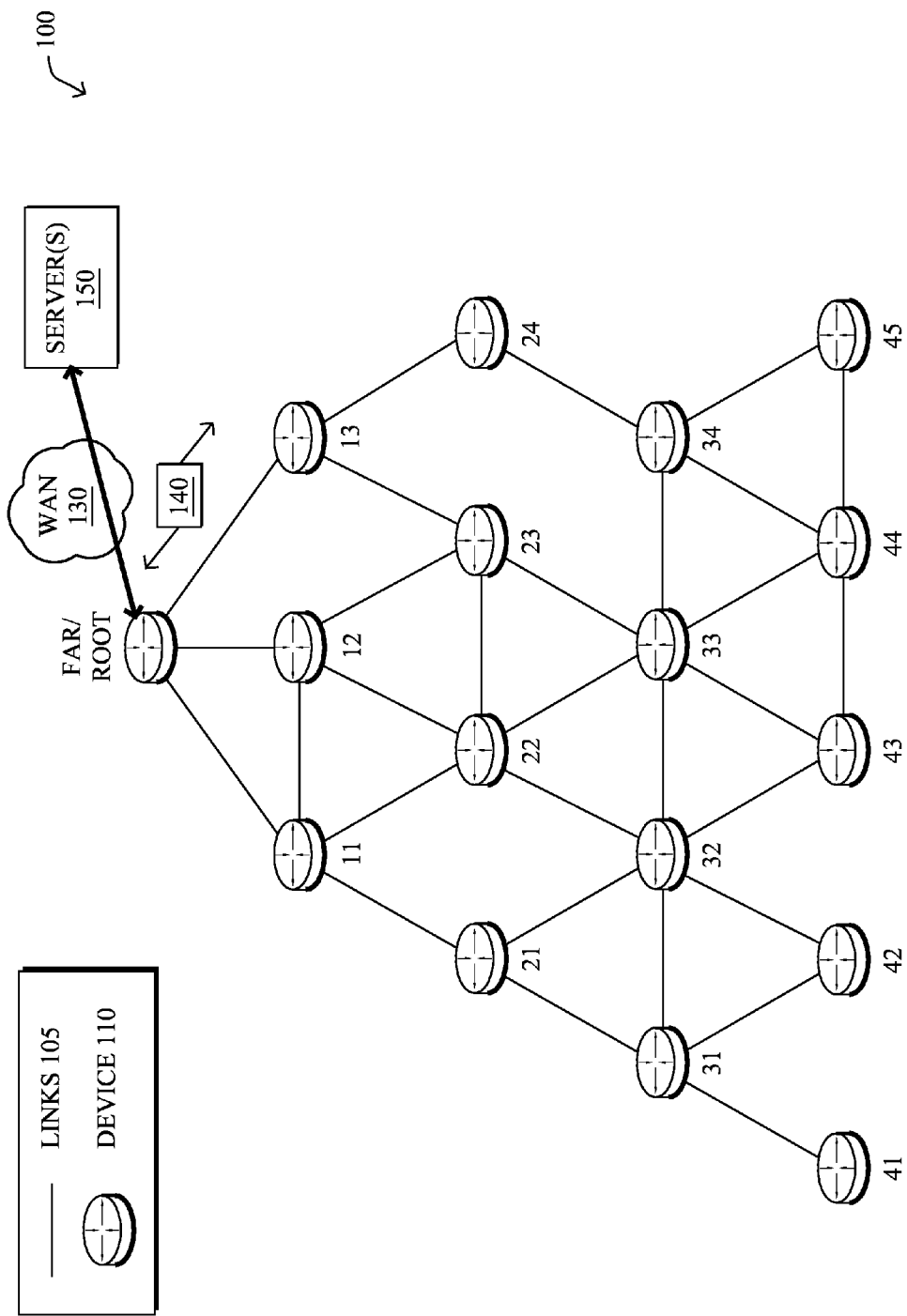
FIG. 1 illustrates an example communication network.

According to one or more embodiments of the disclosure, techniques are shown and described relating to binary search-based approach in routing-metric agnostic topologies for node selection to enable effective learning machine mechanisms. In one embodiment, nodes are polled in a network for Quality of Service (QoS) measurements, and a QoS anomaly that affects a plurality of potentially faulty nodes is detected based on the QoS measurements. A path, which traverses the plurality of potentially faulty nodes, is then computed from a first endpoint to a second endpoint. Also, a median node that is located at a point along the path between the first endpoint and the second endpoint is computed. Time-stamped packets are received from the median node, and the first endpoint and the second endpoint of the path are updated based on the received time-stamped packets, such that an amount of potentially faulty nodes is reduced. Then, the faulty node is identified from a reduced amount of potentially faulty nodes.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 110 (e.g., labeled as shown, "root," "11," "12," . . . "45," and described in FIG. 2 below) interconnected by various methods of communication. For instance, the links 105 may be wired links or shared media (e.g., wireless links, PLC links, etc.) where certain nodes 110, such as, e.g., routers, sensors, computers, etc., may be in communication with other nodes 110, e.g., based on distance, signal strength, current operational status, location, etc. The illustrative root node, such as a field area router (FAR) of a FAN, may interconnect the local network with a WAN 130, which may house one or more other relevant devices such as management devices or servers 150, e.g., a network management server (NMS), a dynamic host configuration protocol (DHCP) server, a constrained application protocol (CoAP) server, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages) may be exchanged among the nodes/devices of the computer network 100 using predefined network communication protocols such as certain known wired protocols, wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
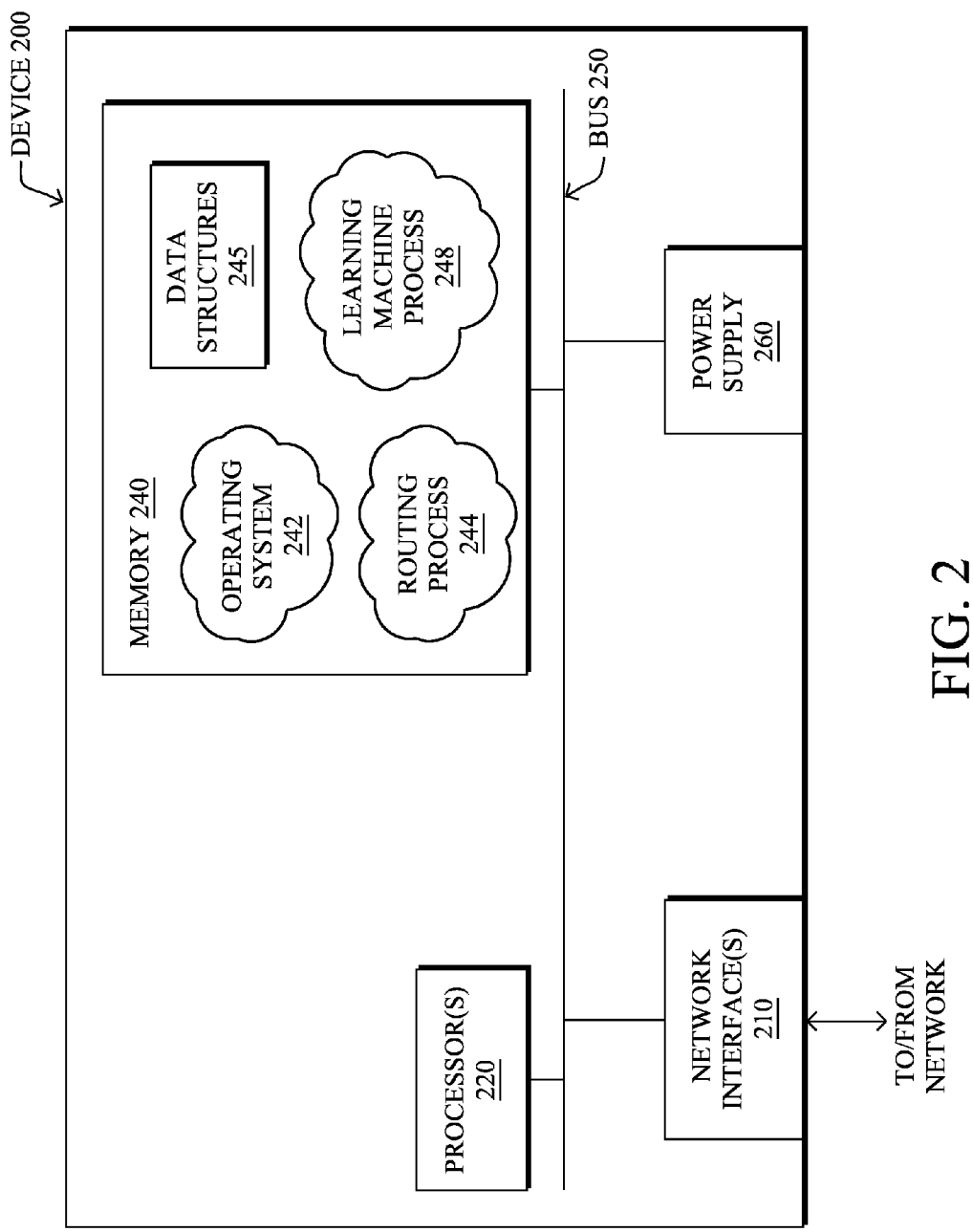
FIG. 2 illustrates an example network device/node.

FIG. 2 is a schematic block diagram of an example node/device 200 that may be used with one or more embodiments described herein, e.g., as any of the nodes or devices shown in FIG. 1 above. The device may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC (where the PLC signal may be coupled to the power line feeding into the power supply) the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. An operating system 242, portions of which are typically resident in memory 240 and executed by the processor, functionally organizes the device by, inter alia, invoking operations in support of software processes and/or services executing on the device. These software processes and/or services may comprise a routing process/services 244 and an illustrative "learning machine" process 248, which may be configured depending upon the particular node/device within the network 100 with functionality ranging from intelligent learning machine algorithms to merely communicating with intelligent learning machines, as described herein. Note also that while the learning machine process 248 is shown in centralized memory 240, alternative embodiments provide for the process to be specifically operated within the network interfaces 210.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a routing/forwarding table (a data structure 245) containing, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Notably, mesh networks have become increasingly popular and practical in recent years. In particular, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point such at the root node to a subset of devices inside the LLN) and multipoint-to-point traffic (from devices inside the LLN towards a central control point).

An example implementation of LLNs is an "Internet of Things" network. Loosely, the term "Internet of Things" or "IoT" (or "Internet of Everything" or "IoE") may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs), FARs, or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

Also, a directed acyclic graph (DAG) is a directed graph having the property that all edges are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Note also that a tree is a kind of DAG, where each device/node in the DAG generally has one parent or one preferred parent. DAGs may generally be built (e.g., by a DAG process and/or routing process 244) based on an Objective Function (OF). The role of the Objective Function is generally to specify rules on how to build the DAG (e.g. number of parents, backup parents, etc.).

Figure 3:
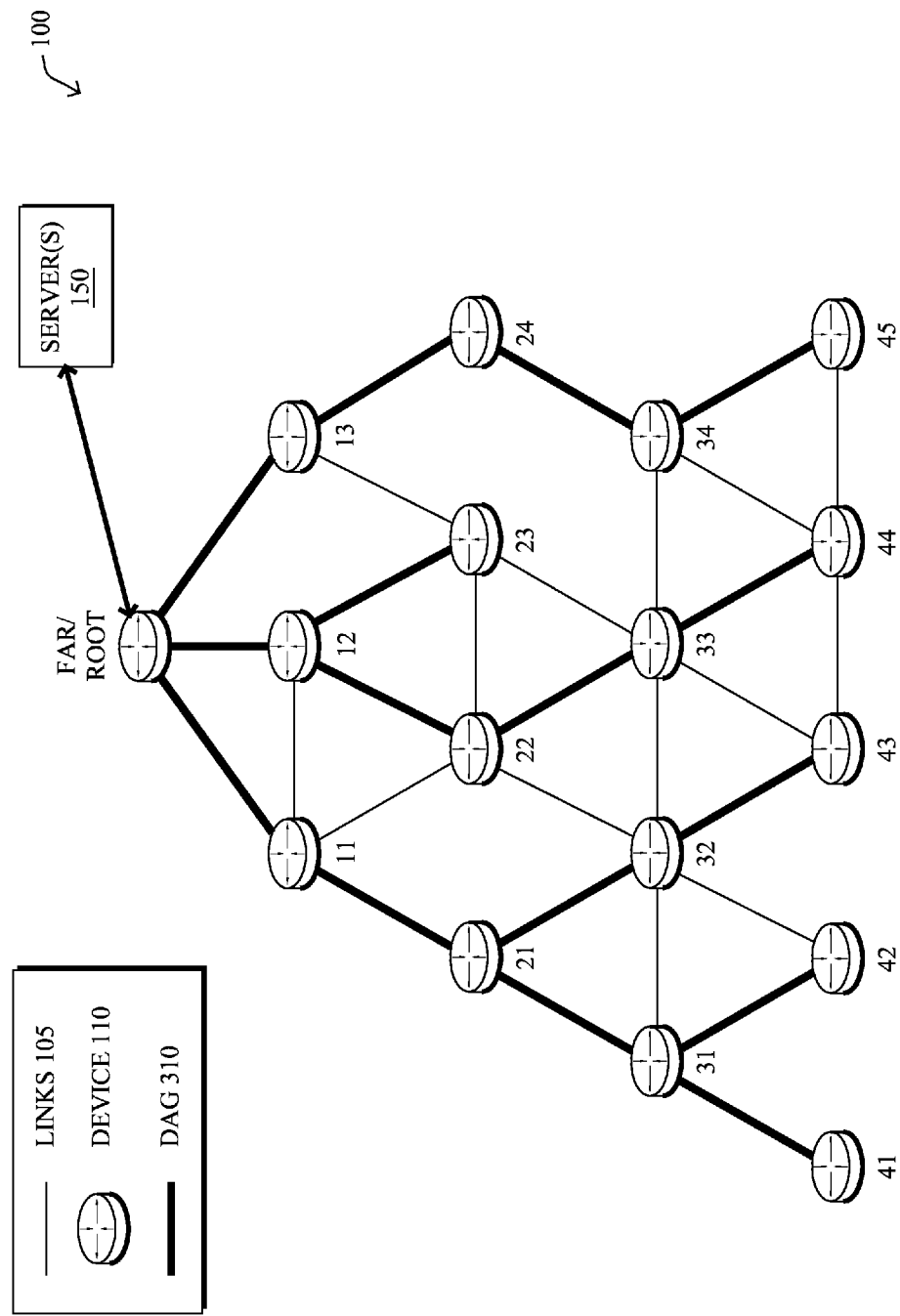
FIG. 3 illustrates an example directed acyclic graph (DAG) in the communication network of FIG. 1.

FIG. 3 illustrates an example simplified DAG that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as bolded lines), which extends from the root node toward one or more leaf nodes (nodes without children). Traffic/packets 140 (shown in FIG. 1) may then traverse the DAG 310 in either the upward direction toward the root or downward toward the leaf nodes, particularly as described herein.

Learning Machine Technique(s)

As noted above, machine learning (ML) is concerned with the design and the development of algorithms that take as input empirical data (such as network statistics and state, and performance indicators), recognize complex patterns in these data, and solve complex problem such as regression thanks to modeling. One very common pattern among ML algorithms is the use of an underlying model M, whose parameters are optimized for minimizing the cost function associated to M, given the input data. For instance, in the context of classification, the model M may be a straight line that separates the data into two classes such that $M=a*x+b*y+c$ and the cost function would be the number of misclassified points. The ML algorithm then consists in adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

As also noted above, learning machines (LMs) are computational entities that rely one or more ML algorithm for performing a task for which they haven't been explicitly programmed to perform. In particular, LMs are capable of adjusting their behavior to their environment. In the context of LLNs, and more generally in the context of the IoT (or Internet of Everything, IoE), this ability will be very important, as the network will face changing conditions and requirements, and the network will become too large for efficiently management by a network operator. Thus far, LMs have not generally been used in LLNs, despite the overall level of complexity of LLNs, where "classic" approaches (based on known algorithms) are inefficient or when the amount of data cannot be processed by a human to predict network behavior considering the number of parameters to be taken into account.

With the concept of distributed intelligence gaining tremendous traction (using for example a variety of Learning Machine based algorithms), there is a lack of several key elements in the architecture in current networks that would allow the deployment of these mechanisms rapidly. One of the key components of an intelligent mechanism relates to data gathering at the right place in the network. For example, a popular way to capture health of the network is to gather transit times of packets in the network. This allows one to figure out where there is degraded QoS within the network.

Figure 4:
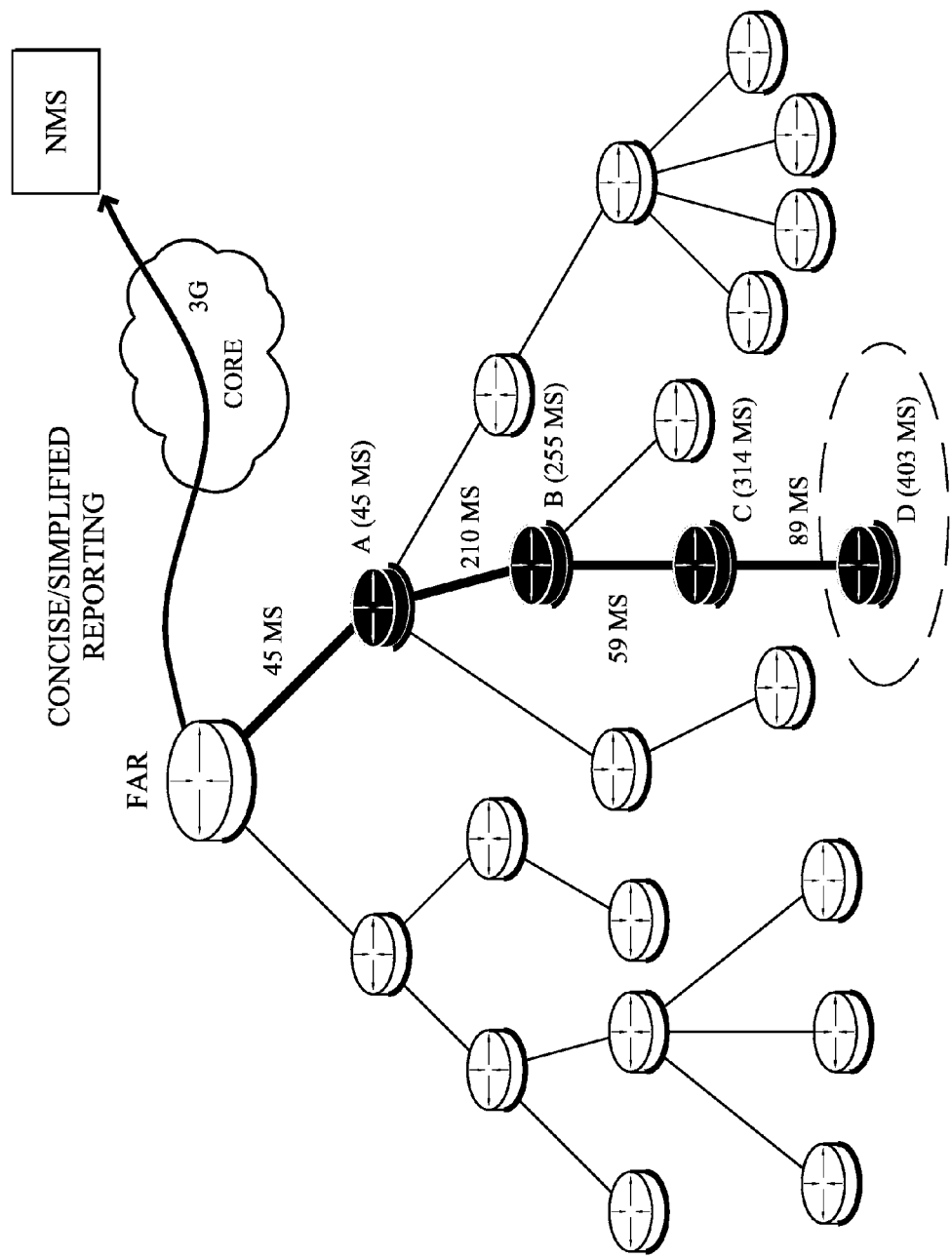
FIG. 4 illustrates another example DAG and illustrative delays.

FIG. 4 depicts a different view of a typical routing DAG constructed by a routing protocol such as RPL. Assume that the node D has is reported to have an abnormal delay of 403 ms by the LM or a NMS (e.g., this delay may be too large for a node of this rank). A close inspection of the DAG shown in FIG. 4 reveals that the link between A and B is responsible for this abnormal delay: as a result, all nodes from B down to D have an abnormal delays.

With current approaches, such performance issues are troubleshot using brute force methods. The network operator would need to detect the problem (i.e., D has an abnormal delay), and he would start probing the delay of each parent up to the FAR, one by one. This approach is simply not scalable in LLNs found in real-world applications, where the DAG may reach up to twenty hops in depth. Not only is manually probing the QoS of that many nodes prohibitively tedious, but also the brute force approach generates a lot of overhead, non-compressible traffic (time-stamping, etc.), both within the PAN and between the FAR and the NMS.

Also, in current LLNs, connectivity details can be determined from routing protocol control plane information. All links have some sort of a metric (such as specified in RFC6551) that governs how the topology is formed and this in turn allows one to easily determine the logical location in the topology. In other words, routing metrics makes it easier to search the topology dynamically using inferences from the protocol information and then logically narrow down areas of downgraded QoS. That being said, in a near future however, smart objects might have minimalistic connections to the network thereby making it almost impossible to rely on any routing-metric based information to narrow down areas of degraded service.

The techniques herein, therefore, propose a mechanism where once degradation in QoS is observed by the NMS or a Learning Machine in the network thanks to time-stamping of end nodes, nodes are polled by the DAG root in a fashion similar to a binary search to narrow down the area of affected QoS. Once the area has been localized, QoS probing and other information gathering techniques may be deployed. Notably, the techniques herein keep in mind the unavailability of routing metrics such as ETX that allow current day mechanisms to be deployed.

Said differently, in the near future LLNs will be deployed in a very large scale and a majority of objects will be connected in a minimalistic fashion without sharing any link quality metrics. In this situation, localizing and troubleshooting poor QoS areas will be a prime concern. The techniques herein introduce a mechanism for identifying faulty links/areas that cause deterioration of QoS of a given node $n_i$ or a set of nodes in a metric agnostic environment. In particular, the techniques herein illustratively use a binary search approach to quickly determine the affected area. In iterations of the binary search algorithm, a midpoint node is selected and sent a message to start time-stamping packets. The observed time-stamps are then compared with previous values to determine whether the localization should continue or whether the affected area has been found. By using such an approach, we reduce the number of nodes to be selected and messages to be sent from N to $\log_2(N)$ in the worst case, where N is the hop count of $n_i$. In another embodiment, the techniques herein use a probabilistic model of the QoS evolution along the path from the FAR to $n_i$. This model takes the form of a Bayesian network that captures the dependence between the QoS of each node and that of its parent. Using this model, the techniques herein propose an algorithm that is capable of searching multiple faulty links in parallel.

In one embodiment, nodes are polled in a network for Quality of Service (QoS) measurements, and a QoS anomaly that affects a plurality of potentially faulty nodes is detected based on the QoS measurements. A path, which traverses the plurality of potentially faulty nodes, is then computed from a first endpoint to a second endpoint. Also, a median node that is located at a point along the path between the first endpoint and the second endpoint is computed. Time-stamped packets are received from the median node, and the first endpoint and the second endpoint of the path are updated based on the received time-stamped packets, such that an amount of potentially faulty nodes is reduced. Then, the faulty node is identified from a reduced amount of potentially faulty nodes.

Illustratively, the techniques described herein may be performed by hardware, software, and/or firmware, such as in accordance with the learning machine process 248, which may contain computer executable instructions executed by the processor 220 (or independent processor of interfaces 210) to perform functions relating to the techniques described herein, e.g., optionally in conjunction with other processes. For example, certain aspects of the techniques herein may be treated as extensions to conventional protocols, such as the various communication protocols (e.g., routing process 244), and as such, may be processed by similar components understood in the art that execute those protocols, accordingly. Also, while certain aspects of the techniques herein may be described from the perspective of a single node/device, embodiments described herein may be performed as distributed intelligence, also referred to as edge/distributed computing, such as hosting intelligence within nodes 110 of a Field Area Network in addition to or as an alternative to hosting intelligence within servers 150.

Operationally, the techniques herein illustratively consist of three main components: detection, searching, and messaging.

First, the Field Area Router (FAR) may be configured to constantly track the QoS statistics for all the nodes that are in its DAG. QoS measuring may be performed on a continuous basis and can employ a LM for detecting anomalies. Once an anomaly is detected for a given target node $n_i$ or a set of nodes that are exhibiting poor QoS, the second and third components of techniques herein are initiated.

Figure 5:
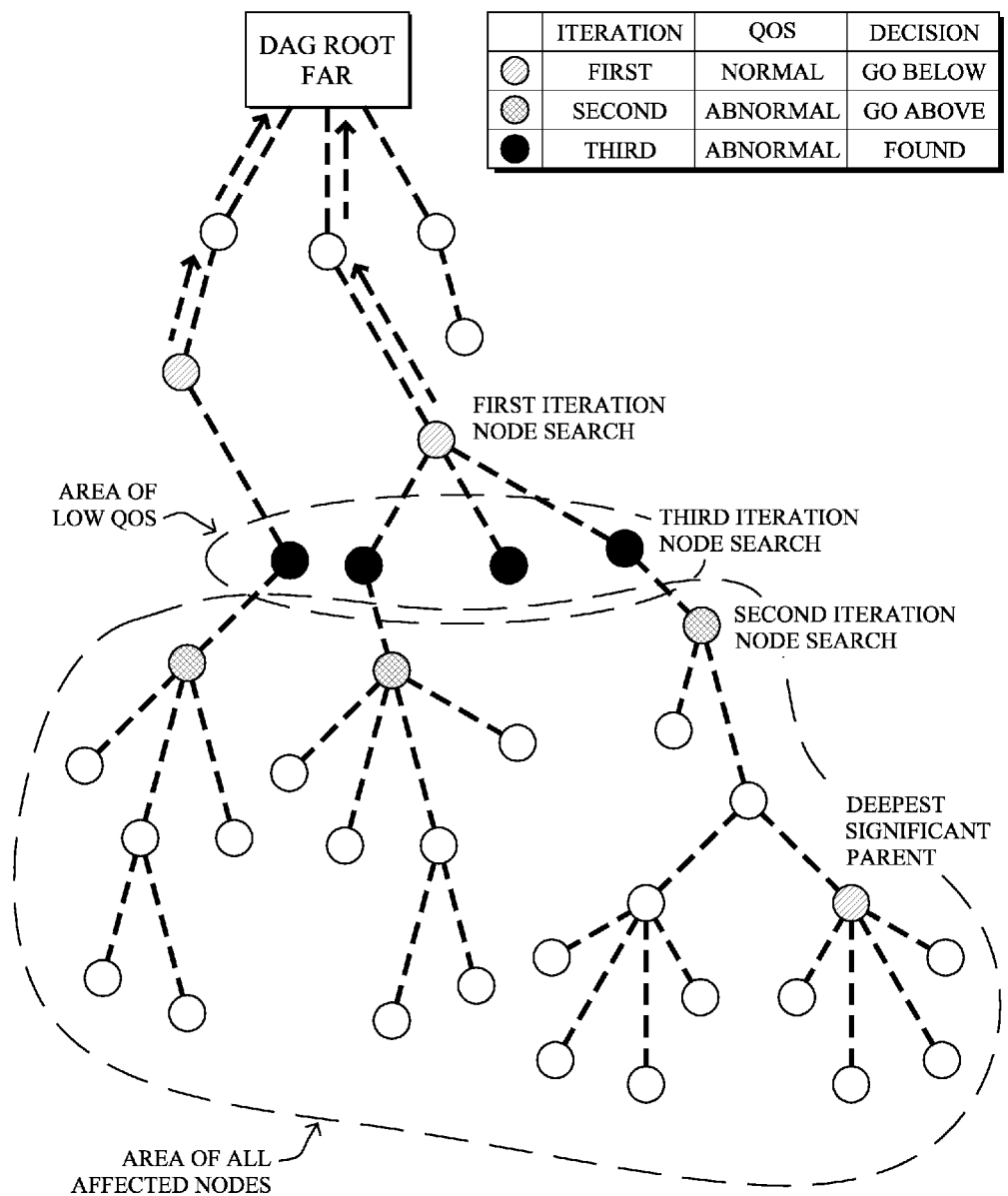
FIG. 5 illustrates an example iterative node search.

In particular, looking at its topology database, the DAG root tries to narrow down the link or area where the problem may lie. Again, since there is no information about any state shared with the root, the only information it has is connectivity. The illustrative searching algorithm is as follows, with reference generally to FIG. 5:

1. Determine the paths that contain the nodes that are showing low QoS. At this point, it may be uncertain as to which node(s) is responsible for the low QoS. Thus, for the purposes of the present disclosure, the nodes that are showing low QoS may be considered "potentially faulty nodes."
2. For each path, determine the last child that has children, i.e., the bottom most non-leaf node. This will be one of the bounds of the search. We call this node as the "Deepest Significant Parent" (DSP).
3. Determine the node that lies midway on the path between the DSP and the DAG root.
4. The DAG root now sends a newly defined message to this mid-point node asking it to timestamp a subset of packets.
5. Once the mid point node has sent the time-stamped packets, the DAG root analyzes them to determine whether this node is affected by the low QoS or not.
   a. If not, it can be inferred that the affected area lies logically below this node in the tree. The DAG root now proceeds to compute a new midpoint node between the DSP and this node.
   b. If the node is affected by low QoS, then the affected area lies logically above this node. The DAG root now proceeds to compute a new midpoint node between the DAG root and this node.
6. The DAG root now moves back to step 4 in this algorithm.
7. This sequence of steps from 4-6 keeps repeating till there are no midpoints and the two nodes that signify the bounds are next to each other. In this state, the algorithm has narrowed down the area where the affected links lie.

As mentioned before, this mechanism is based on the principle of binary search as the depth (e.g., rank) of the node is implicitly used as a search metric to perform the search.

Using this approach, one may reduce the average complexity of the faulty link search from O(K) to O(log(K)) where K is the hop count of the initial abnormal node. One benefit of this "divide-and-conquer" approach is that it can be applied to any section of the DAG. For example, if more than one link/area is faulty and separated by non-faulty areas, then the algorithm could narrow down the areas containing both, after which the algorithm could be run again to further isolate the areas by correlating the timestamps. In this situation, the first completion of the algorithm will find the area of low QoS that is closest one to the FAR. Another search may then be initiated to find the others, while accounting for the previously identified faulty links (that is, by correcting the QoS values of the nodes that are downstream of these links).

In one embodiment, the DAG is a tree and each node has a single parent. In this case, there is only a single path from the FAR to the target node and the binary search only occurs up/down a single path. In particular, the algorithm for selecting the mid-point is simply the device that is halfway in between to divide the search region in two.

In another embodiment, the DAG forms multiple paths between the FAR and target node, with each node having one or more parents. In this case, if the result of probing shows that a node is not affected by low QoS, then either the affected area lies below the probed node or along a different path to the target node. To properly address this case, the algorithm for selecting the mid-point also needs to take into account the number of nodes below the probed node or along different paths. In other words, the search space no longer lies along a single path, but across a DAG. As a result, the mid-point selection algorithm does not necessarily choose a node that is halfway along a path to the target device, but one that maximizes the expected number of nodes that can be eliminated from the search space after obtaining a probe result.

In another embodiment, the techniques herein assume that the LM builds a probabilistic model of the QoS evolution along the path from the FAR to $n_i$. In particular, the QoS of each node $n_j$ in this path is modeled by the joint distribution $P(Q_1, \ldots Q_i)$. A chain-shaped Bayesian Network can factor this joint distribution as the product of conditional distributions $P(Q_i|Q_{i-1}) P(Q_{i-1}|Q_{i-2}) \ldots P(Q_2|Q_1) P(Q_1)$. Now, upon evaluating the QoS $q_j$ node $n_j$ midway between the FAR and $n_i$, the algorithm can compute $P(Q_i|Q_j=q_j)=P(Q_i|Q_{i-1}) \ldots P(Q_{j+1}|Q_j=q_j)$. If this probability $P(Q_i|Q_j=q_j)$ is large, this means that the actual QoS of $n_i$ given the QoS of $n_j$ is normal, and we can therefore conclude that no faulty link lies between $n_i$ and $n_j$. The algorithm would then proceed to probe the portion of the path that is upstream of $n_j$. If the probability $P(Q_i|Q_j=q_j)$ is small, then there is some faulty link between $n_i$ and $n_j$. However, this doesn't preclude the existence of another faulty link between $n_j$ and the FAR. To this end, the techniques herein proceed as in the first component mentioned above, and evaluate $P(Q_j)$ to test the normality of $n_j$. If both $P(Q_i|Q_j=q_j)$ and $P(Q_j)$ are abnormal, then the techniques herein search in parallel both sub-paths (upstream and downstream of $n_j$). The binary search approach can be trivially parallelized as it can be written in recursive form.

Figure 6:
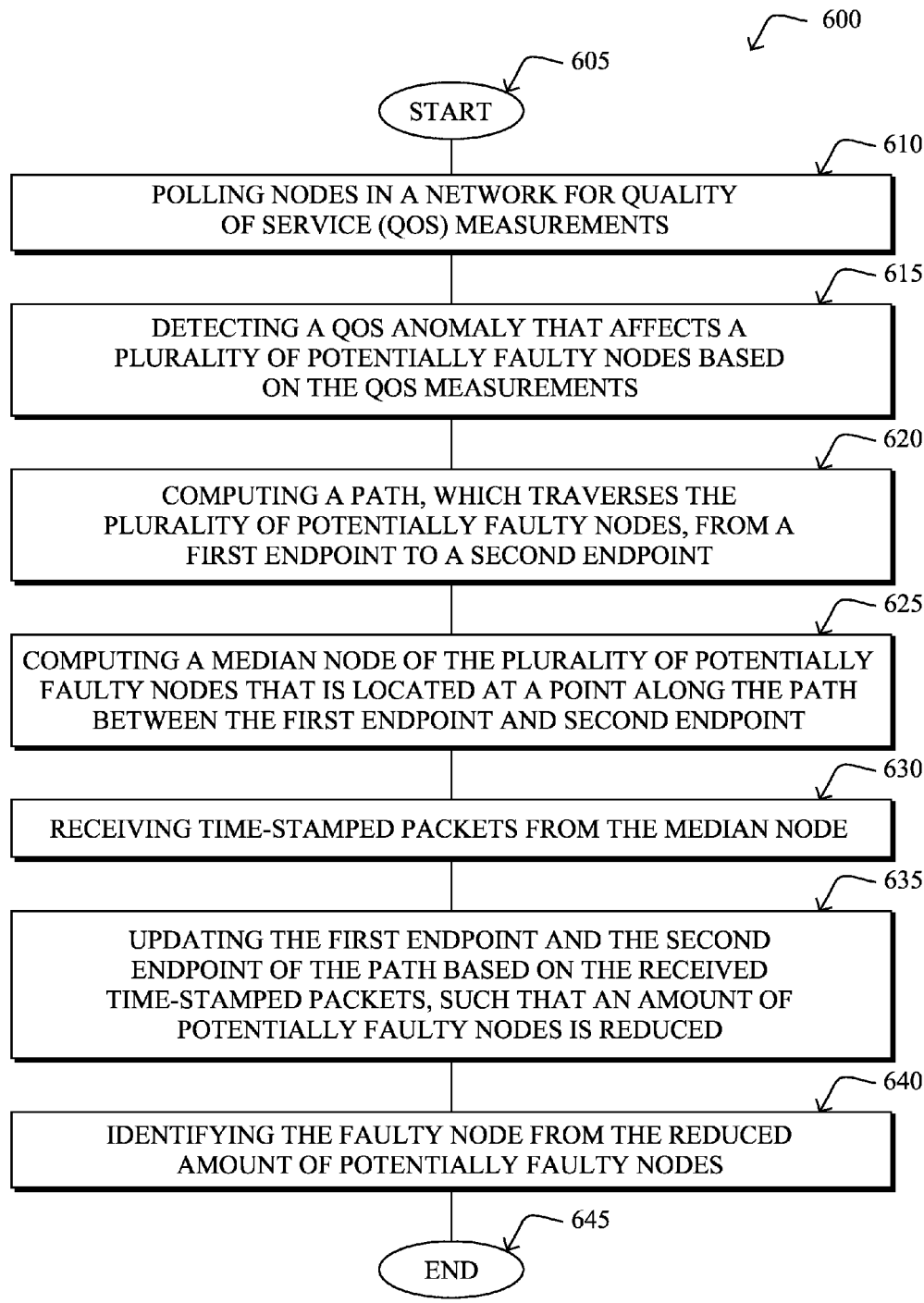
FIG. 6 illustrates an example simplified procedure for a binary search-based approach in routing-metric agnostic topologies for node selection to enable effective learning machine mechanisms.

FIG. 6 illustrates an example simplified procedure for a binary search-based approach in routing-metric agnostic topologies for node selection to enable effective learning machine mechanisms. As shown in FIG. 6, the procedure 600 may start at step 605, continue to step 610, and so forth, where, as described in greater detail above, a faulty node of a plurality of potentially faulty nodes is determined using a binary search-based approach.

At Step 610, the procedure 600 includes polling nodes in a network for QoS measurements. At Step 615, a QoS anomaly that affects a plurality of potentially faulty nodes is detected based on the QoS measurements. The plurality of potentially faulty nodes may include a faulty node causing the QoS anomaly. At Step 620, a path, which traverses the plurality of potentially faulty nodes, is computed from a first endpoint to a second endpoint. A root node of the network may be the first endpoint, and a node of the plurality of potentially faulty nodes may be the second endpoint. At Step 625, a median node of the plurality of potentially faulty nodes that is located at a point along the path between the first endpoint and the second endpoint is computed. At Step 630, time-stamped packets are received from the median node. At Step 635, the first endpoint and the second endpoint of the path are updated based on the received time-stamped packets, such that an amount of potentially faulty nodes is reduced. At Step 640, the faulty node is identified from the reduced amount of potentially faulty nodes. The procedure 600 illustratively ends at Step 645. The techniques by which the steps of procedure 600 are performed, as well as ancillary procedures and parameters, are described in detail above.

It should be understood that the steps shown in FIG. 6 are merely examples for illustration, and certain steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for binary search-based approach in routing-metric agnostic topologies for node selection to enable effective learning machine mechanisms. In particular, in a scenario where no metric is available to determine quality of links, the techniques herein provide a mechanism to narrow down areas of poor QoS so that active techniques to rectify the situation can be applied effectively. This is a very significant advantage as all similar mechanisms now rely strongly on knowing connectivity information and link state information before any reactive process can be started. Also, in a scenario where no link metric information is available, the techniques herein reduce the number of probes to be sent from N to $\log_2(N)$ in the worst case, where N is the hop count of ni. Note also that in one embodiment, the techniques herein are capable of searching multiple faulty links in parallel.

While there have been shown and described illustrative embodiments that provide for binary search-based approach in routing-metric agnostic topologies for node selection to enable effective learning machine mechanisms, it is to be understood that various other adaptations and modifications may be made within the spirit and scope of the embodiments herein. For example, the embodiments have been shown and described herein with relation to LLNs and related protocols. However, the embodiments in their broader sense are not as limited, and may, in fact, be used with other types of communication networks and/or protocols. In addition, while the embodiments have been shown and described with relation to learning machines in the specific context of communication networks, certain techniques and/or certain aspects of the techniques may apply to learning machines in general without the need for relation to communication networks, as will be understood by those skilled in the art.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
polling nodes in a network for Quality of Service (QoS) measurements;
detecting a QoS anomaly that affects a plurality of potentially faulty nodes based on the QoS measurements, wherein the plurality of potentially faulty nodes includes a plurality of areas of the network where a faulty node causing the QoS anomaly potentially lies;
computing a path, which traverses the plurality of potentially faulty nodes, from a first endpoint to a second endpoint, wherein a root node of the network is the first endpoint, and a node of the plurality of potentially faulty nodes is the second endpoint;
computing a median node of the plurality of potentially faulty nodes that is located at a point along the path between the first endpoint and the second endpoint;
receiving time-stamped packets from the median node;
updating the first endpoint and the second endpoint of the path based on the received time-stamped packets to narrow down the plurality of areas of the network where the faulty node causing the QoS anomaly potentially lies, such that an amount of potentially faulty nodes is reduced;
comparing the received time-stamped packets with previous values to determine whether further narrowing of the plurality of areas of the network should continue or whether a faulty area has been found; and
in response to determining that the faulty area has been found, identifying the faulty node from the reduced amount of potentially faulty nodes.

2. The method according to claim 1, further comprising:
determining whether a new median node that is located at a point along the path between the updated first endpoint and the updated second endpoint exists.

3. The method according to claim 2, further comprising:
when a new median node exists, determining whether the median node is affected by the QoS anomaly based on the received time-stamped packets.

4. The method according to claim 3, wherein:
when the median node is affected by the QoS anomaly, the new median node is located at a point along the path between the root node and the median node, and
when the median node is not affected by the QoS anomaly, the new median node is located at a point along the path between the median node and the deep node.

5. The method according to claim 4, further comprising:
repeating the steps of receiving time-stamped packets from the median node and updating the first endpoint and the second endpoint of the path based on the received time-stamped packets until no new median node exists.

6. The method according to claim 2, wherein when no new median node exists, the faulty node is identified as an endpoint.

7. The method according to claim 1, wherein the point along the path between the first endpoint and the second endpoint is an approximate midway point along the path between the first endpoint and the second endpoint.

8. The method according to claim 1, further comprising:
sending a message to the median node requesting that the median node apply time-stamps to one or more packets.

9. The method according to claim 1, wherein the second endpoint is a deepest node of the plurality of potentially faulty nodes that has one or more child nodes.

10. The method according to claim 1, further comprising:
computing a plurality of paths from the first endpoint to the second endpoint, wherein
when the median node is not affected by the QoS anomaly, the new median node is located at a point along one of the plurality of paths, such that a maximum amount of potentially faulty nodes is reduced.

11. The method according to claim 1, further comprising:
calculating a probabilistic model of QoS measurements corresponding to the plurality of potentially faulty nodes.

12. An apparatus, comprising:
one or more network interfaces that communicate with a network;
a processor coupled to the one or more network interfaces and configured to execute a process; and
a memory configured to store program instructions which contain the process executable by the processor, the process comprising:
polling nodes in the network for Quality of Service (QoS) measurements;
detecting a QoS anomaly that affects a plurality of potentially faulty nodes based on the QoS measurements, wherein the plurality of potentially faulty nodes includes a plurality of areas of the network where a faulty node causing the QoS anomaly potentially lies;
computing a path, which traverses the plurality of potentially faulty nodes, from a first endpoint to a second endpoint, wherein a root node of the network is the first endpoint, and a node of the plurality of potentially faulty nodes is the second endpoint;
computing a median node of the plurality of potentially faulty nodes that is located at a point along the path between the first endpoint and the second endpoint;
receiving time-stamped packets from the median node;
updating the first endpoint and the second endpoint of the path based on the received time-stamped packets to narrow down the plurality of areas of the network where the faulty node causing the QoS anomaly potentially lies, such that an amount of potentially faulty nodes is reduced;
comparing the received time-stamped packets with previous values to determine whether further narrowing of the plurality of areas of the network should continue or whether a faulty area has been found; and
in response to determining that the faulty area has been found, identifying the faulty node from the reduced amount of potentially faulty nodes.

13. The apparatus according to claim 12, wherein the process further comprises:
determining whether a new median node that is located at a point along the path between the updated first endpoint and the updated second endpoint exists.

14. The apparatus according to claim 13, wherein the process further comprises:
when a new median node exists, determining whether the median node is affected by the QoS anomaly based on the received time-stamped packets.

15. The apparatus according to claim 14, wherein:
when the median node is affected by the QoS anomaly, the new median node is located at a point along the path between the root node and the median node, and
when the median node is not affected by the QoS anomaly, the new median node is located at a point along the path between the median node and the deep node.

16. The apparatus according to claim 15, wherein the process further comprises:
repeating the steps of receiving time-stamped packets from the median node and updating the first endpoint and the second endpoint of the path based on the received time-stamped packets until no new median node exists.

17. The apparatus according to claim 13, wherein when no new median node exists, the faulty node is identified as an endpoint.

18. The apparatus according to claim 12, wherein the point along the path between the first endpoint and the second endpoint is an approximate midway point along the path between the first endpoint and the second endpoint.

19. The apparatus according to claim 12, wherein the process further comprises:
sending a message to the median node requesting that the median node apply time-stamps to one or more packets.

20. The apparatus according to claim 12, wherein the second endpoint is a deepest node of the plurality of potentially faulty nodes that has one or more child nodes.

21. The apparatus according to claim 12, wherein the process further comprises:
computing a plurality of paths from the first endpoint to the second endpoint, wherein
when the median node is not affected by the QoS anomaly, the new median node is located at a point along one of the plurality of paths, such that a maximum amount of potentially faulty nodes is reduced.

22. The apparatus according to claim 12, wherein the process further comprises:
calculating a probabilistic model of QoS measurements corresponding to the plurality of potentially faulty nodes.

23. A tangible non-transitory computer readable medium storing program instructions that cause a computer to execute a process, the process comprising:
polling nodes in a network for Quality of Service (QoS) measurements;
detecting a QoS anomaly that affects a plurality of potentially faulty nodes based on the QoS measurements, wherein the plurality of potentially faulty nodes includes a plurality of areas of the network where a faulty node causing the QoS anomaly potentially lies;
computing a path, which traverses the plurality of potentially faulty nodes, from a first endpoint to a second endpoint, wherein a root node of the network is the first endpoint, and a node of the plurality of potentially faulty nodes is the second endpoint;
computing a median node of the plurality of potentially faulty nodes that is located at a point along the path between the first endpoint and the second endpoint;
receiving time-stamped packets from the median node;
updating the first endpoint and the second endpoint of the path based on the received time-stamped packets to narrow down the plurality of areas of the network where the faulty node causing the QoS anomaly potentially lies, such that an amount of potentially faulty nodes is reduced;
comparing the received time-stamped packets with previous values to determine whether further narrowing of the plurality of areas of the network should continue or whether a faulty area has been found; and
in response to determining that the faulty area has been found, identifying the faulty node from the reduced amount of potentially faulty nodes.

* * * * *